Sept. 29, 1931. A. E. DRISSNER 1,824,878
CHUCK OPERATING MECHANISM
Filed Oct. 10, 1928 3 Sheets-Sheet 3
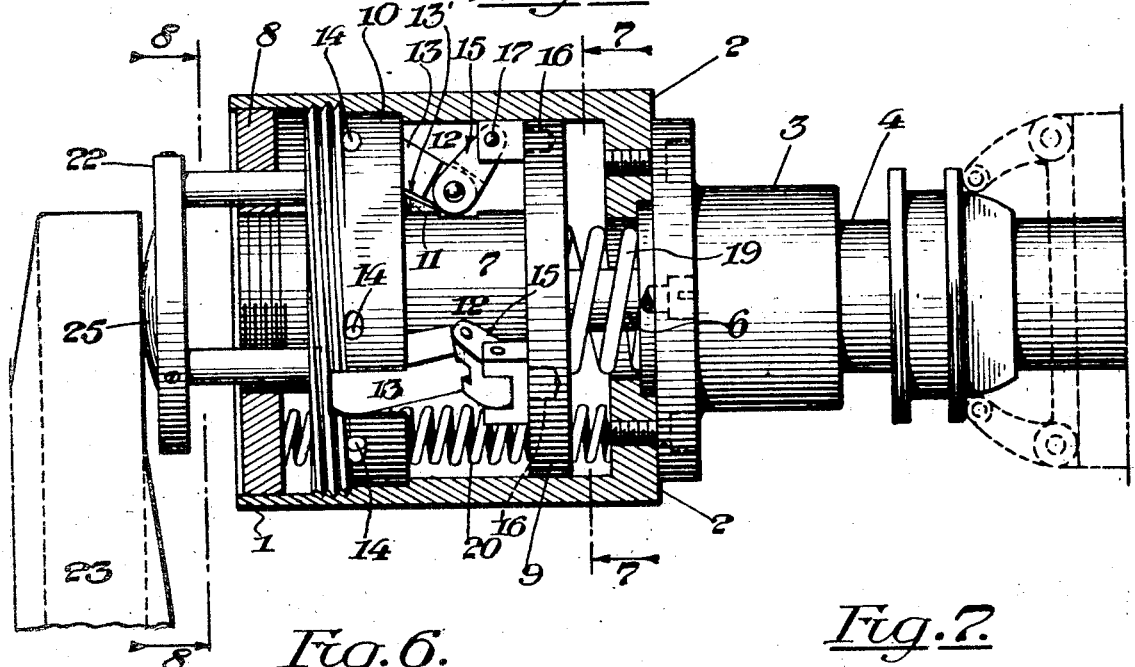
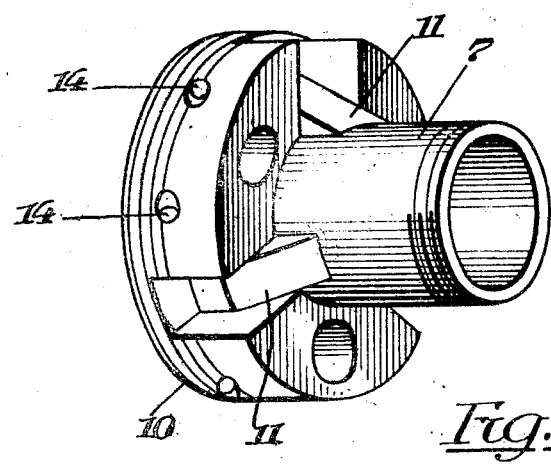
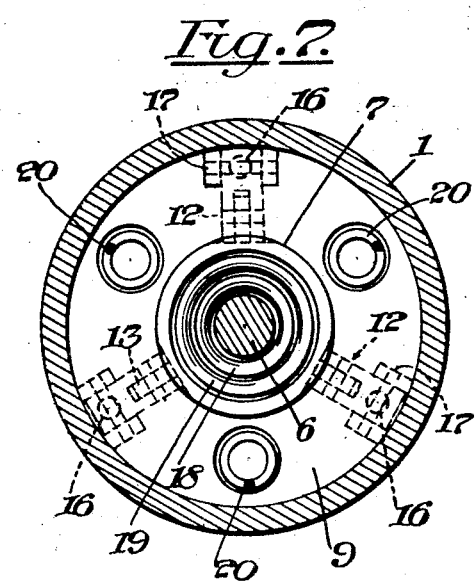
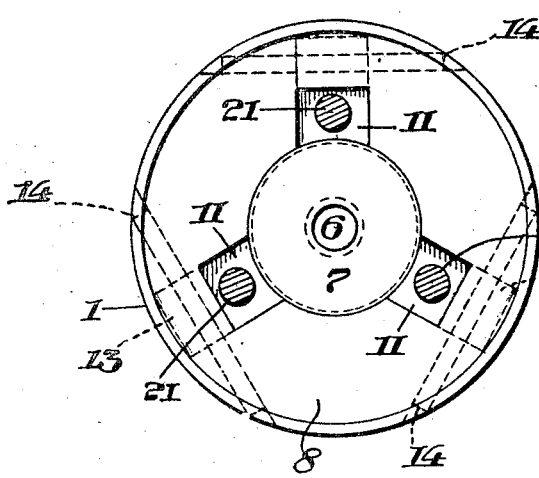
Inventor
Alfred E. Drissner
by his Attorney Patented Sept. 29, 1931

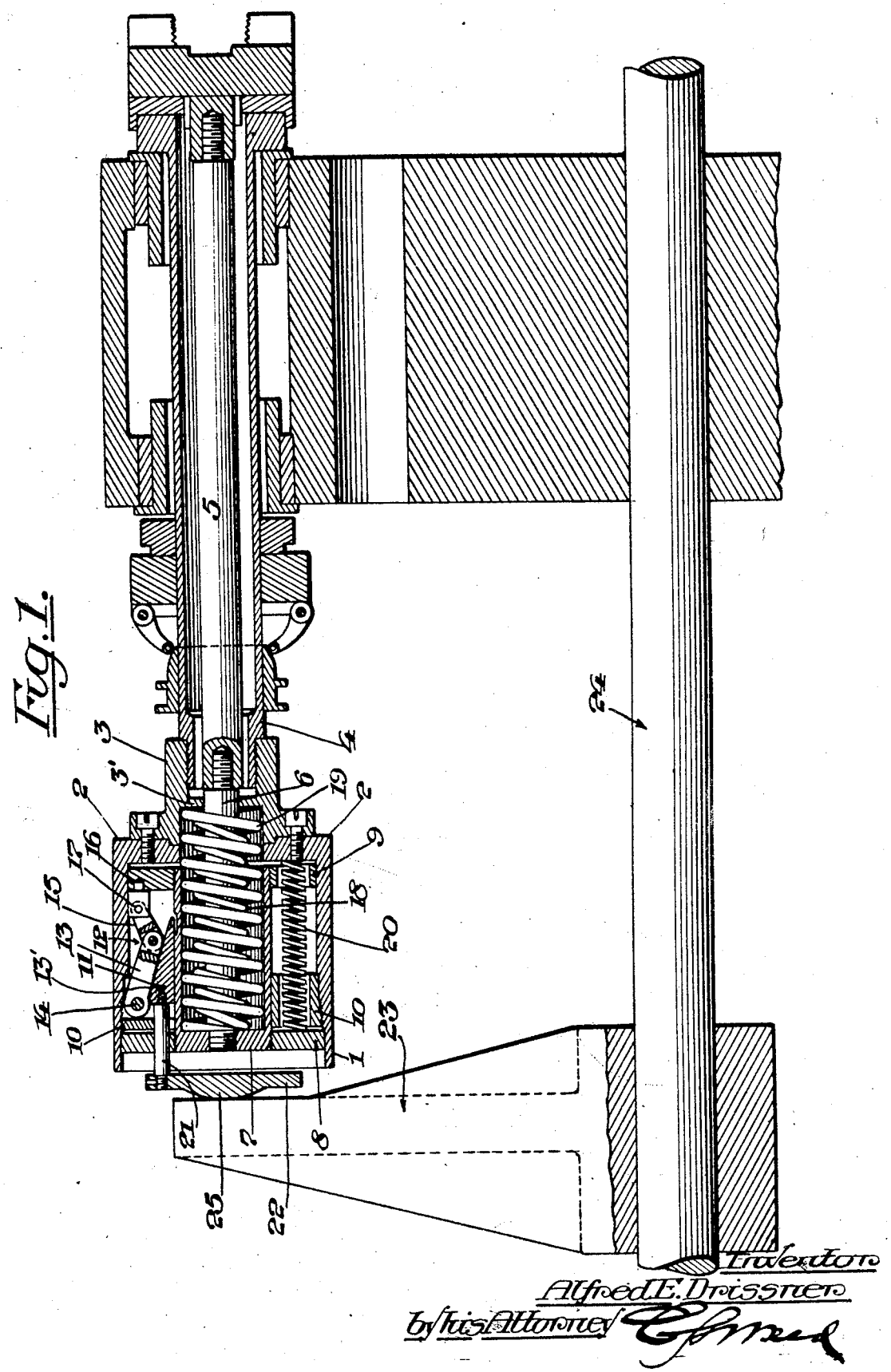

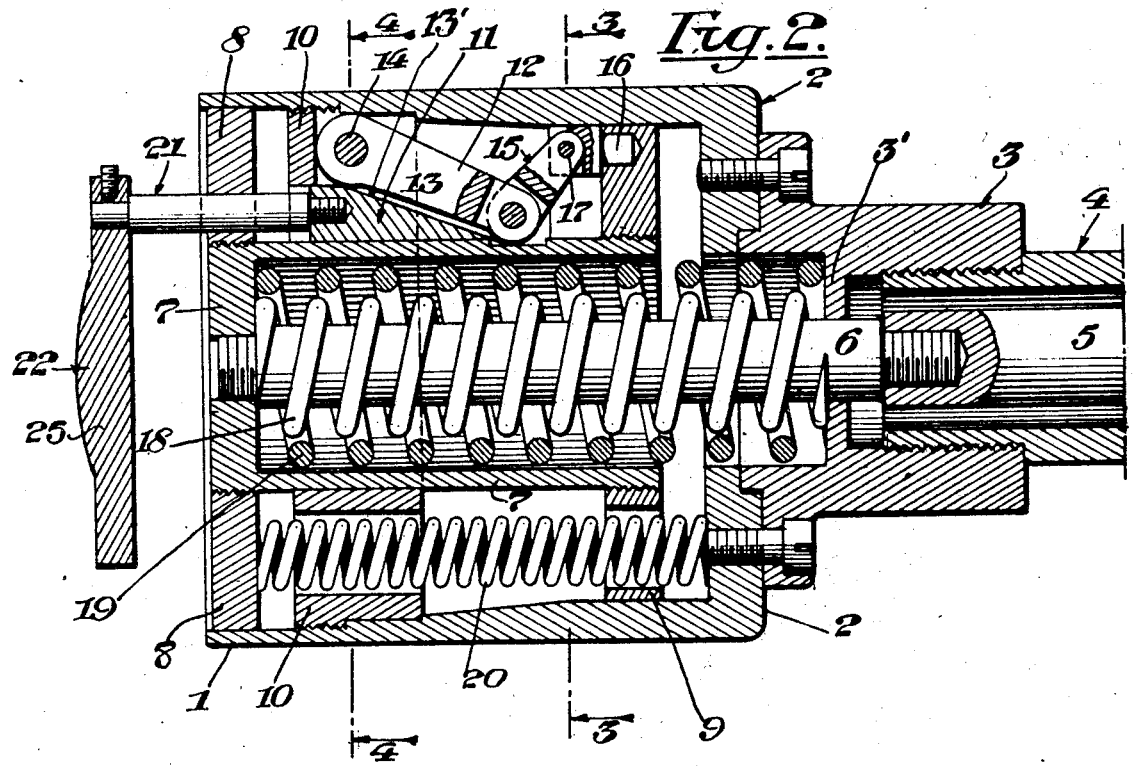

1,824,878

UNITED STATES PATENT OFFICE

ALFRED E. DRISSNER, OF CLEVELAND, OHIO, ASSIGNOR TO THE NATIONAL ACME COMPANY, OF CLEVELAND, OHIO, A CORPORATION OF OHIO

CHUCK OPERATING MECHANISM

Application filed October 10, 1928. Serial No. 311,495.

This invention relates to chuck operating mechanisms, the object of the invention being to provide an improved mechanically-operated chuck mechanism which will permit the chuck to accommodate itself to variations in the pieces of work up to the limitation of the chuck or the extreme travel of the jaws thereof.

A further object of the invention is the provision of an improved mechanically-operated chuck mechanism which can be manufactured as a separate complete unit and easily adapted for use with a collet, chuck, pusher or adapter-expanding arbor and which is comparatively simple, inexpensive to manufacture and extremely efficient in operation and can be operated either automatically or by hand and readily applied to various forms of machines and is particularly well adapted for a metal working machine having an indexible chuck carrier and can be readily substituted in various forms of machines for air-controlled chucks and is, therefore, usable in those places where air is not used and is more efficient than air-controlled chuck mechanisms since it eliminates the difficulty of leaking joints and valves and packing replacements.

Another object of the invention is the provision of an improved mechanically-operated chuck mechanism embodying the use of springs of considerable power and means which will operate such powerful springs easily and readily with a minimum amount of effort.

In the ordinary mechanical chuck where the closing movement is controlled by positive means such as a cam, there is no give to the chuck jaws and consequently variations in the work pieces cannot be accommodated. In other words, where the castings are rough castings or somewhat vary in size, it is impossible to accommodate these variations in the work; but in the present improvement, by reason of the fact that the closing movement of the chuck jaws is under the control of springs, these springs will give to a certain extent and permit any variations from one-sixteenth to one-eighth of an inch ($\frac{1}{16}''$ to $\frac{1}{8}''$) to be accommodated in the chuck jaws,—so that the chuck will accommodate variations in the pieces of work up to the limitations of the chuck or the extreme travel of the jaws,—and this is a very important advantage.

In the drawings accompanying and forming a part of this specification—

Figure 1 is a longitudinal sectional view of this improved chuck operating mechanism shown applied to a metal working machine intended to have an indexible chuck carrier, only so much of the machine being shown as is necessary to illustrate the present improvement—this view illustrating the chuck operating mechanism in that position where the chuck is open;

Fig. 2 is an enlarged longitudinal sectional view of this improved chuck operating mechanism—this view illustrating the mechanism in that position where the chuck is closed;

Fig. 3 is a cross-sectional view taken on line 3—3, Fig. 2;

Fig. 4 is a cross-sectional view taken on line 4—4, Fig. 2;

Fig. 5 is a partly sectional view of this chuck operating mechanism—this view illustrating the mechanism in that position where the chuck is closed;

Fig. 6 is a perspective view of the wedge-carrying block;

Fig. 7 is a cross-sectional view taken on line 7—7, Fig. 5; and

Fig. 8 is a partly cross-sectional view taken on line 8—8, Fig. 5.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

The entire chuck operating mechanism is carried in a suitable housing 1 in the form of a cylinder, the board front wall 2 of which is bolted to a suitable adapter 3 by means of which the unit may be secured to various forms of spindles by merely changing the form of the adapter. In the present instance the adapter 3 is screwed securely to the rear end of a spindle 4 within which is located a draw-bar 5 for operating the chuck jaws, collet or pusher carried at the forward end of the chuck spindle 4. Secured or screwed to the rear end of this draw-bar 5 is a rod 6 passing through the adapter 3 and secured at its rear end to a sliding sleeve or cylinder 7 located within the housing 1. This sleeve 7 has secured thereto at its rear end a plate 8 closing the rear end of the housing 1 and slideable therein with the sleeve or cylinder 7. At the forward end of the sleeve 7 it is provided with another plate 9 likewise slideable within the housing 1. Adjacent to the rear end of the housing 1 is located a wedge-carrying block 10 screwed securely into the housing 1, this block being provided with suitable guideways for supporting a plurality of wedges 11, shown as three in number—although they may be in the form of a circular cone or tapered sleeve, if preferred—and to this wedge-carrying block is pivotally connected a plurality of toggle levers 12, each of which comprises a long lever 13 which is curved or relieved at its under side, as at 13', and pivotally secured by a pin 14 to the wedge-carrying block in position to be engaged by a wedge 11. To this long lever or link 13 is connected a short link 15, the opposite end of which is pivoted to a link post 16 secured in the plate 9 at the front end of the sleeve 7 by a pin 17. Located within the sleeve 7 and between the rear wall thereof and an inwardly-extending wall 3' of the adapter 3 and encircling the rod 6, is a pair of powerful springs 18 and 19,—these springs being adapted, for instance, to exert a pressure of about 2,500 pounds,—a plurality of springs being shown in view of the fact that the desired pressure could probably not be obtained by a single spring in view of the short length of the springs. In practice other springs, such as 20, may be used to increase the pressure when desired, these springs being located between the rear plate 8 and the front wall of the housing 1. For operating the wedge-carrying blocks 11, they are connected by pins 21 with a plate or disk 22 which may be operated by any suitable means. In the present instance it is shown operated by a lever arm 23 carried on a stub shaft 24. When the chuck is indexible, this arm 23 is stationary and may be shifted in and out by a suitable cam on a cam shaft, for which purpose the arm may be provided with a roller, or it may be shifted in and out by a suitable lever by hand. This arm 23 is adjustable on the shaft 24 to bring it into position to operate the chuck according to the indexed position thereof. In the present instance, as shown, when the chuck spindle is indexed into the position shown in Fig. 1, for example, that particular chuck will be operated by the lever to shift inward the plate 22 which is suitably surfaced, as at 25, to facilitate the proper co-operation of the lever arm 23. In the operation of this improved chuck operating means, when the lever arm 23 is moved inwardly, or toward the right in Fig. 1, it shifts the block or disk 25 and thereby the wedges connected therewith, which thereupon shift the toggle links outwardly toward their dead-center positions, and these links thus shift the sleeve 7 and the connected parts thereof, which thus act as a piston and compress the springs, all of the wedges acting simultaneously to shift the toggle links in the manner described. The advance of the wedges thus operates the toggle links and advances the sliding sleeve 7 and, as stated, compresses the springs, while at the same time shifting the rod 6 and draw-bar 5, thereby opening the chuck jaws or collet or whatever may be connected with the draw-bar 5 for the reception of the work pieces. When in this position and the chuck jaws are to be closed to grip the work, the lever arm 23 is shifted rearwardly, or to the right in Fig. 1, away from the plate 22, whereupon the springs force the sliding sleeve 7 toward the left, carrying the wedges from under the links 13 of the toggle links and permitting them to return to their normal position and simultaneously pulling the draw-bar 5, thereby closing the chuck jaws or operating any other device in the manner stated.

Thus I have provided a very simple, mechanically-operated chuck mechanism which may be manufactured as a unit and applied to various forms of machines by the use of a simple adapter and which chuck operating mechanism is efficient to take up variations in the castings or work pieces within the limits of the chuck or the travel of the jaws thereof.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In an operating mechanism of the class described, the combination of a sliding member, a compressible spring for shifting said member in one direction, toggle levers for shifting the member in the opposite direction and movable means located interiorly of and in direct contact with said toggle levers for operating said toggle levers.

2. In an operating mechanism of the class described, the combination of a sliding member, a compressible spring for shifting said member in one direction, toggle levers for shifting the member in the opposite direction, a block having a guideway, a slidable wedge located in said guideway, and means for shifting said wedge for operating said toggle levers.

3. In an operating mechanism of the class described, the combination of a housing, an adapter carried thereby for attachment to a spindle, a sliding sleeve within the housing, a rod carried thereby for attachment to a bar within the spindle, a pair of plates secured to the sleeve and slideable within the housing, a block secured to the housing and encircling the sleeve, toggle links connected with the block and with one of the plates connected with the sleeve, wedges carried by said block, means connected therewith for shifting them, and springs located within the housing and co-acting with the sleeve for shifting said sleeve in one direction, the wedges being operative to operate the toggle links and shift the sleeve in the opposite direction thereby to compress the springs.

4. In an operating mechanism of the class described, the combination of a housing, an adapter carried thereby for attachment to a spindle, a sliding sleeve within the housing, a rod carried thereby for attachment to a bar within the spindle, a pair of plates secured to the sleeve and slideable within the housing, a wedge carrying block secured to the housing and encircling the sleeve, toggle mechanism connected with the block and with one of the plates connected with the sleeve, a sliding wedge carried by said block, and means connected therewith and projecting through one of the plates secured to the sleeve in position to be shifted thereby to shift the wedges, a spring located within the sleeve and around the rod for shifting said sleeve in one direction, the wedges being operative to operate the toggle links and shift the sleeve in the opposite direction thereby to compress the spring.

5. In an operating mechanism of the class described, the combination of a housing, an adapter carried thereby for attachment to a spindle, a sliding sleeve within the housing, a rod carried thereby for attachment to a bar within the spindle, a pair of plates secured to the sleeve and slideable within the housing, a wedge carrying block secured to the housing and encircling the sleeve, toggle levers connected with the block and with one of the plates connected with the sleeve, a sliding wedge carried by said block and in position to engage the under face of one of said toggle levers, means connected therewith and projecting through one of the plates secured to the sleeve in position to be shifted thereby to shift the wedges, a spring located within the sleeve and around the rod for shifting said sleeve in one direction, the wedges being operative to operate the toggle links and shift the sleeve in the opposite direction thereby to compress the spring, and supplemental springs located within said housing and co-acting with said first spring.

6. In an operating mechanism of the class described, the combination of a hollow sliding member, a compressible spring located therein for shifting said member in one direction, a toggle lever and a movable wedge for operating said lever to shift said member in the opposite direction thereby to compress the spring and located interiorly of said toggle lever and substantially between a pair of pivotal points thereof.

7. In an operating mechanism of the class described, the combination of a hollow sliding member, a rod carried by said sliding member for attachment to a bar, a pair of plates secured to said sliding member and slidable therewith, a compressible spring located in the sliding member for shifting said member in one direction, toggle levers, a wedge for operating said levers to shift said member in the opposite direction thereby to compress the spring, and a spring located exteriorly of said sliding member and co-acting with the interiorly located spring.

8. In an operating mechanism of the class described, the combination of a housing, an interchangeable adapter secured thereto, a sliding member within said housing, a rod carried by said sliding member for attachment to a bar, a pair of plates secured to said sliding member and slidable within the housing, a compressible spring for shifting said member in one direction, toggle levers for shifting the member in the opposite direction, and means for operating said toggle levers.

9. In an operating mechanism of the class described, the combination of a housing, an interchangeable adapter secured thereto, a sliding member within said housing, a rod carried by said sliding member for attachment to a bar, a pair of plates secured to said sliding member and slidable within the housing, a compressible spring for shifting said member in one direction, toggle levers and a wedge for operating said levers to shift the member in the opposite direction and thereby compressing the spring, and means for operating the wedge.

10. In an operating mechanism of the class described, the combination of a housing adapted for attachment to a spindle, a sliding sleeve within said housing and provided with a pair of plates engaging the inner walls of the housing, a rod carried by said sleeve and adapted for attachment to a member within the spindle, a spring located on the rod and cooperating with the sleeve for shifting the sleeve in one direction, a wedge carrying block secured to the housing and encircling the sleeve, wedges carried by the block, toggle links secured to the block and the forward plate of the sleeve and in position to be engaged by the wedges, and means for shifting said wedges thereby to shift the toggle links and shift the sleeve to compress the spring.

11. In an operating mechanism of the class described, the combination of a housing adapted for attachment to a spindle, a sliding sleeve within said housing and provided with a pair of plates engaging the inner walls of the housing, a rod carried by said sleeve and adapted for attachment to a member within the spindle, a spring located on the rod and cooperating with the sleeve for shifting the sleeve in one direction, a wedge carrying block secured to the housing and encircling the sleeve, wedges carried by the block, toggle links secured to the block and the forward plate of the sleeve and in position to be engaged by the wedges, means for shifting said wedges thereby to shift the toggle links and shift the sleeve to compress the spring, and supplemental springs located exteriorly of said sleeve and co-acting with the spring thereof.

12. In an operating mechanism of the class described, the combination of a housing adapted for attachment to a metal working machine, a sliding sleeve therein adapted for attachment to an operating part of said machine, a rod carried by said sliding member for attachment to a bar, a pair of plates secured to said sliding member and slidable within the housing, a compressible spring for shifting said sliding member in one direction, toggle levers connected with the housing and with said sleeve for shifting it in the opposite direction, wedge means located around the sleeve for shifting said toggle levers, and means for operating said wedge means thereby to expand the toggle levers and shift the sleeve against the action of its spring and compress such spring.

Signed at Cleveland, Ohio, this 27th day of September, 1928.

ALFRED E. DRISSNER.